No. 757,670. PATENTED APR. 19, 1904.
A. C. McCLOSKEY.
ELECTRICALLY HEATED SOLDERING IRON.
APPLICATION FILED MAY 6, 1903.
NO MODEL.
FIG. 1.
FIG. 2.
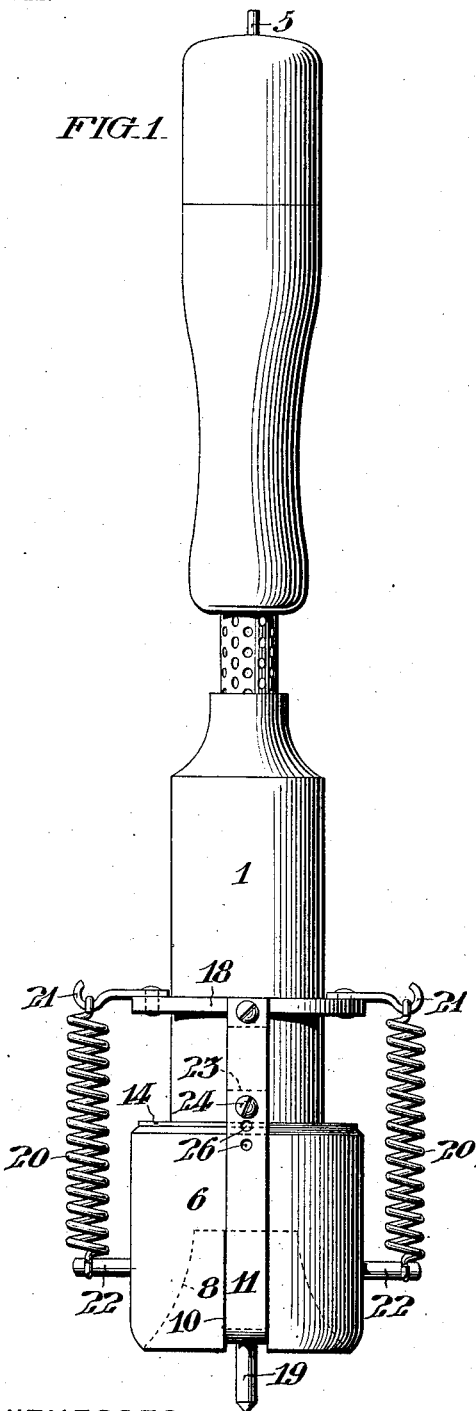
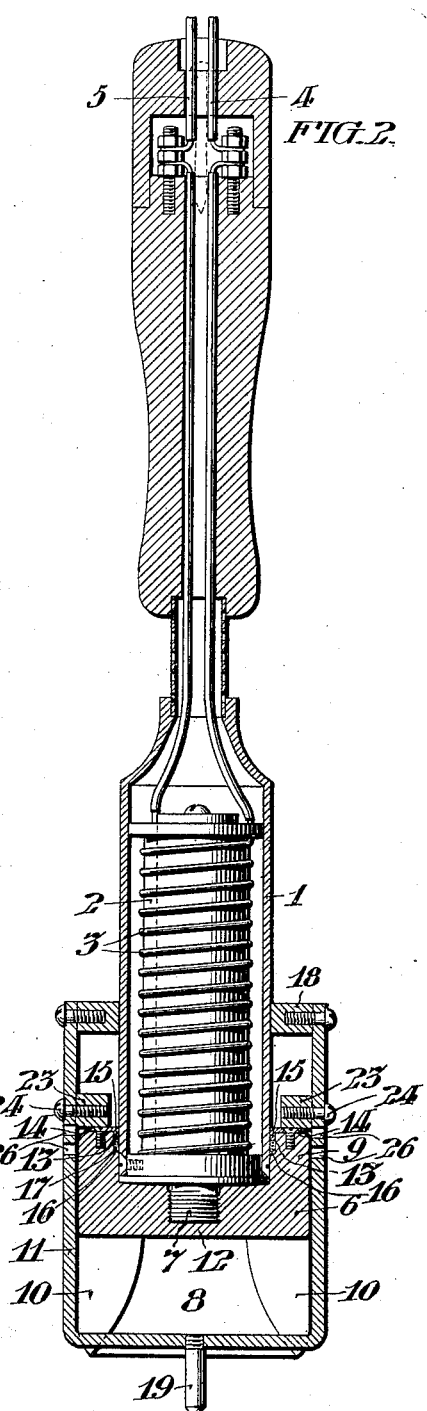
WITNESSES:
INVENTOR:
Alfred C. McCloskey
by his Attorney No. 757,670. Patented April 19, 1904.

UNITED STATES PATENT OFFICE.

ALFRED C. McCLOSKEY, OF PHILADELPHIA, PENNSYLVANIA.

ELECTRICALLY-HEATED SOLDERING-IRON.

SPECIFICATION forming part of Letters Patent No. 757,670, dated April 19, 1904.

Application filed May 6, 1903. Serial No. 155,820. (No model.)

*To all whom it may concern:*

Be it known that I, ALFRED C. MCCLOSKEY, a citizen of the United States, residing in the city and county of Philadelphia and State of Pennsylvania, have invented certain new and useful Improvements in Electrically-Heated Soldering-Irons, of which the following is a specification.

This invention relates to an improvement in electrically heated soldering irons, and its object is to provide means whereby the heating of the soldering cylinder or iron is facilitated, and also to provide means whereby the working parts of the device are protected from the action of the acid fumes which are generated in the operation of soldering.

As illustrated, my invention is applied to a device applicable to the purpose of soldering caps to the tops of cans, but it will be understood that it may be employed in connection with a soldering iron suitable for other purposes and in which the soldering iron is of different shape or contour.

The invention resides in the combination and arrangement of parts hereinafter set forth in the specification and drawings, and specifically pointed out in the claims.

In the drawings, Figure 1 is a side elevation, and Figure 2 is a longitudinal sectional view.

Referring to the drawings, 1 designates a heating iron provided with a heating core 2, the said core being heated by means of the electricity resisting coil 3, the said coil being connected to the electric conducting wires 4 and 5, as clearly shown.

No attempt will be made to describe the electric heating device in greater detail, because it is old and well known, and its details of construction constitute no part of my invention.

Secured to the heating iron 1 is the soldering cylinder or iron 6, the said heater and soldering cylinder being connected by a screw-threaded connection 7. The soldering cylinder or iron is, as shown, cylindrical in form and its lower end is hollowed out to form a space 8, and also the operating lower edges of the soldering iron which are beveled in the manner clearly shown in Figure 2. The upper end of the soldering cylinder or iron is provided with a flange 9 which surrounds the lower end portion of the heating iron 2.

Slots 10 are provided upon opposite sides of the soldering iron, the said slots being provided for the purpose of allowing the escape of the gases and acid fumes from within the hollowed out space in the lower end of the soldering iron, and also for the purpose of permitting movement of the U-shaped frame 11, with respect to the soldering cylinder or iron.

It will be observed that the hollowed out space previously referred to is separated from the screw-threaded connecting portion 7 by means of the portion of metal 12, shown in Figure 2, the purpose of such metal being to prevent access of acid fumes to the working parts of the device.

In order to still further prevent the access of acid fumes to the lower end of the heating iron and to the region of the connection between said heating iron and the soldering iron, I have provided a packing 13, which consists of the circular metallic flat ring 14, located upon the top of the flange 9, and having a depending flange 15 arranged at right angles to the plane of the ring 14, as clearly shown. The said flange 15 occupies a position between the upper edge of the flange 9 and the body of the heating iron.

Located between the lower edge of said flange 15 and the upper edge of a shoulder 16, which is formed upon the inner surface of the flange 9, is a packing 17 which may consist of any suitable material, preferably asbestos.

It will be obvious that by reason of the separating portion of metal 12 and the packing device 13, it is impossible for the fumes of an acid employed in the operation of soldering to enter between the soldering cylinder or iron and the lower edge of the heating iron. The U-shaped frame 11, previously referred to, as illustrated, consists of a single strip of metal bent to U-form, the upwardly extending legs thereof being connected to the opposite sides of a ring 18, surrounding the heating iron, as clearly shown in each of the figures of the drawings, and adapted to slide upon said heating iron.

Secured to the lower side of the U-shaped frame 11 in any suitable manner, is a pointed device 19 for holding the caps down upon the tops of the cans during the soldering operation, in the usual and well known manner.

In order to hold the U-shaped frame 11, the ring 18 and the pointed cap holder 19 down in the projected position illustrated, the springs 20 are shown which are connected at their upper ends to the hooks 21 secured to the ring 18, and at their lower ends to lugs or projections 22, extending outwardly from the cylindrical soldering iron.

As illustrated, the hooks 21 are made separately from and are attached to the ring 18, but it is obvious that the said hooks may be made integral with the said ring. It is also obvious that the wire springs 20 may be located at a greater or less distance from the soldering cylinder than is shown in the drawings.

It is evident that by the continued use of the device, the operating edges of the soldering iron become worn and, therefore, shortened, and, in order that the lower part of the U-shaped frame may always occupy the position substantially as shown with respect to the lower end of said soldering iron, means are provided for adjusting the said U-shaped frame with respect to the soldering iron from time to time.

This means consists of the adjustable stops 23 secured to the opposite sides of the U-shaped frame, by means of screws 24 which pass through any one of the series of openings 26 shown in the opposite sides of the said U-shaped frame 11.

In the operation of using the device, an electric current is passed through the resistance coils 3, whereby the temperature of the heating iron is raised to the desired point, such heat being conducted to the soldering iron 6, the flanges 9 facilitating very materially the heating operation.

The caps are placed upon the tops of the cans in connection with a circular piece of solder in the usual manner, after which the holding point 19 is placed upon the center of the cap, whereupon the soldering iron is moved into contact with the cap, and with the top of the can at their junction.

The heated iron melts the solder and one or more rotations of the soldering iron distributes the solder and firmly secures the cap to the top of the can, forming an air-tight connection between the two parts, after which the soldering iron is removed to another can, the cap being held upon the can until the solder cools or sets in any suitable or convenient manner.

It is to be understood that the necessary acid is employed in the usual manner.

Having thus described my invention, I claim—

1. The combination of an electrically heated heating iron, a soldering head provided with a hollowed out lower end, a partition of metal separating the space formed in the lower end of the soldering iron from the lower end of the heating iron, and means for connecting the heating iron and the soldering iron together.

2. In an electrically heated soldering apparatus, in combination, a heating iron, a soldering iron, a frame located exteriorly of said soldering iron, in engagement therewith, and adapted to move longitudinally thereof, and means for maintaining the frame in projected position relative to the said soldering iron.

3. In an electrically heated soldering apparatus, in combination, a heating iron, a soldering iron having slots formed upon opposite sides thereof, a U-shaped frame secured to the soldering apparatus and adapted to move longitudinally thereof, the said frame being guided by said slots.

4. In a soldering apparatus, in combination, an electrically heated heating iron, a cylindrical soldering head connected thereto, and provided with a hollowed out lower end, a partition of metal separating the space formed in the lower end of the soldering iron from the lower end of the heating-iron, vertical flanges formed upon the upper end of the soldering iron and adapted to surround the lower end of the heating iron, substantially as described.

5. In an electrically heated soldering apparatus, in combination, a heating iron, a cylindrical soldering iron formed with a hollowed out lower end and having slots formed upon opposite sides of the said soldering iron, a U-shaped frame secured to the soldering apparatus and adapted to move longitudinally thereof, the said frame being guided in part by the said slots, substantially as described.

6. In an electrically heated soldering apparatus, in combination, a heating iron, a soldering iron connected to the said heating iron, a movable ring surrounding the heating iron, a U-shaped frame having its respective legs connected to the said ring at opposite sides thereof, and extending longitudinally of the said apparatus, means for guiding the movement of the U-shaped frame, and means for holding the said frame in projected normal position, substantially as described.

7. In an electrically heated soldering apparatus, in combination, a heating iron, a soldering iron provided with a flange which surrounds an end portion of the heating iron, a packing device located at the edge of the said flange, consisting of a flat ring resting upon said flange, and having a flange located at its inner edge and arranged at right angles to the plane thereof and extending between the upper edge of the first named flange and the body of the heating iron, and a suitable packing material located below the flange upon the ring and between the body of the flange upon the soldering iron and the heating iron, substantially as described.

8. In an electrically heated soldering apparatus, in combination, a heating iron, a soldering cylinder having screw threaded connection with the lower end of the said iron, the said cylinder being provided with a hollowed out lower end, a partition of metal separating the space in the lower end of the cylinder from the lower end of the heating iron, flanges formed upon the upper end of the soldering cylinder and adapted to surround the lower end of the heating iron, a movable ring surrounding the heating iron, a U-shaped frame having the respective legs of the U connected at opposite sides of the said ring, and means for holding the said frame in projected position, substantially as described.

9. In an electrically heated soldering apparatus, in combination, a heating iron, a soldering iron connected to the said heating iron, a movable ring surrounding the heating iron, a U-shaped frame having its respective legs connected to the said ring at opposite sides thereof and extending longitudinally of the said apparatus, means for guiding the movement of the U-shaped frame, wire coil springs located at opposite sides of the said apparatus and adapted to hold the said frame in projected position, substantially as described.

In testimony that I claim the foregoing as my invention I have hereunto signed my name this 4th day of May, A. D. 1903.

ALFRED C. McCLOSKEY.

Witnesses:
   THOS. K. LANCASTER,
   LAURA KLEINFELDER.